United States Patent
Yamane et al.

(10) Patent No.: US 7,955,204 B2
(45) Date of Patent: Jun. 7, 2011

(54) STEPPING MOTOR COOLING APPARATUS AND METHOD FOR BELT-TYPE CONTINUOUSLY VARIABLE TRANSMISSION

(75) Inventors: Nobufumi Yamane, Tokyo (JP); Yoshihide Shinso, Kanagawa (JP); Hiroyuki Yada, Kanagawa (JP)

(73) Assignee: Jatco Ltd, Fuji-shi (JP)

( * ) Notice: Subject to any disclaimer, the term of this patent is extended or adjusted under 35 U.S.C. 154(b) by 1471 days.

(21) Appl. No.: 11/086,365

(22) Filed: Mar. 23, 2005

(65) Prior Publication Data

US 2005/0231047 A1    Oct. 20, 2005

(30) Foreign Application Priority Data

Mar. 31, 2004   (JP) .................. 2004-108197

(51) Int. Cl.
*F16H 9/00* (2006.01)
*F16H 59/00* (2006.01)
*F16H 61/00* (2006.01)
*F16H 63/00* (2006.01)

(52) U.S. Cl. ............. 474/70; 474/11; 474/12; 474/17; 474/18; 474/28

(58) Field of Classification Search ............. 474/11, 474/12, 17, 18, 28; 184/11.1, 11.2, 11.3, 184/11.5
See application file for complete search history.

(56) References Cited

U.S. PATENT DOCUMENTS

| | | | | |
|---|---|---|---|---|
| 2,322,172 A * | 6/1943 | Spencer | ............ | 184/6.9 |
| 3,131,582 A * | 5/1964 | Kelbel | ............ | 475/136 |
| 4,418,777 A * | 12/1983 | Stockton | ............ | 180/65.6 |
| 4,579,021 A * | 4/1986 | Yamamuro et al. | ............ | 477/45 |
| 4,597,308 A | 7/1986 | Tanaka et al. | | |
| 5,160,864 A * | 11/1992 | Saito | ............ | 310/54 |
| 5,372,213 A * | 12/1994 | Hasebe et al. | ............ | 180/65.6 |
| 5,418,400 A * | 5/1995 | Stockton | ............ | 290/46 |
| 5,997,431 A * | 12/1999 | Vukovich et al. | ............ | 477/48 |
| 6,488,137 B2 * | 12/2002 | Katou et al. | ............ | 192/70.12 |
| 6,488,601 B1 | 12/2002 | Sommer et al. | | |
| 6,500,083 B2 * | 12/2002 | Hashimoto et al. | ............ | 474/18 |
| 6,561,934 B2 * | 5/2003 | Kashiwase | ............ | 474/28 |
| 6,688,383 B1 | 2/2004 | Sommer et al. | | |
| 6,770,005 B2 * | 8/2004 | Aikawa et al. | ............ | 475/5 |
| 2003/0158009 A1 | 8/2003 | Berger et al. | | |
| 2004/0147361 A1* | 7/2004 | Yasuda et al. | ............ | 475/331 |

FOREIGN PATENT DOCUMENTS

| | | |
|---|---|---|
| DE | 40 03 900 A1 | 4/1991 |
| EP | 0 933 565 A2 | 8/1999 |
| JP | 3-72863 B2 | 11/1991 |

* cited by examiner

*Primary Examiner* — Michael R Mansen
*Assistant Examiner* — Henry Liu
(74) *Attorney, Agent, or Firm* — Foley & Lardner LLP

(57) ABSTRACT

In a stepping motor cooling apparatus for a belt-type continuously variable transmission, a pair of primary and secondary pulleys are disposed inside a transmission case, and a forward/backward switching unit is disposed coaxially to the primary pulley, furthermore, a stepping motor is disposed below the forward/backward switching unit. An inner case originating from the transmission case surrounds a circumference of the forward/backward switching unit. Through the inner case, a dripping hole is formed at an inner case's portion directly above the stepping motor so that working fluid drained from the forward/backward switching unit can drip on the stepping motor. In order to further improve the cooling effect of the stepping motor, a recess portion is formed immediately below the stepping motor at an upper surface of a valve body disposed under the stepping motor.

10 Claims, 7 Drawing Sheets

STEPPING MOTOR COOLING APPARATUS AND METHOD FOR BELT-TYPE CONTINUOUSLY VARIABLE TRANSMISSION

BACKGROUND OF THE INVENTION a) Field of the Invention

The present invention relates to cooling system (or, apparatus) and method for a stepping motor which drives a shift control valve for controlling hydraulic pressure that is supplied to pulleys of a belt-type continuously variable transmission.

b) Description of the Related Art

As a continuously variable transmission that is suitable for an automotive vehicle, there is a belt-type continuously variable transmission using a V-belt (hereinafter, also called a belt-CVT). A Japanese patent application B2 publication No. H03(1991)-72863 published on Nov. 20, 1991 exemplifies a configuration of a belt-CVT. Usually, a belt-CVT includes an oil pan which serves to store working fluid used for lubricating various parts and driving a forward/backward switching mechanism (or, unit) and pulleys. A previously proposed stepping motor cooling system for a belt-type continuously variable transmission cools heat generated in the stepping motor in such a way that the stepping motor is disposed within the stored working fluid.

SUMMARY OF THE INVENTION

In the previously proposed stepping motor cooling system, space for disposing (installing) the stepping motor needs to be set within the stored working fluid. Hence, flexibility for setting the space of the stepping motor is restricted.

It is, therefore, an object of the present invention to provide stepping motor cooling apparatus and method for an automatic transmission, which are capable of cooling the stepping motor without restrictions on layout of the stepping motor.

According to one aspect of the present invention, there is provided a stepping motor cooling apparatus for a continuously variable transmission, comprising: a pair of primary and secondary pulleys disposed inside a transmission case; a forward/backward switching unit disposed coaxially to the primary pulley; a stepping motor disposed below the forward/backward switching unit and inside the transmission case; and an inner case originating from the transmission case, a circumference of the forward/backward switching unit being surrounded by the inner case, a dripping hole being formed through the inner case at an inner case's portion directly above the stepping motor to allow working fluid drained from the forward/backward switching unit to drip on the stepping motor.

According to another aspect of the invention, there is provided a stepping motor cooling method for a continuously variable transmission, comprising: disposing a pair of primary and secondary pulleys inside a transmission case; disposing a forward/backward switching unit coaxially to the primary pulley; disposing a stepping motor below the forward/backward switching unit and inside the transmission case; surrounding a circumference of the forward/backward switching unit with an inner case originating from the transmission case; and dropping working fluid drained from the forward/backward switching unit on the stepping motor from a dripping hole formed through the inner case at an inner case's portion directly above the stepping motor.

The other objects and features of this invention will become understood from the following description with reference to the accompanying drawings.

DETAILED DESCRIPTION OF THE PREFERRED EMBODIMENTS

Figure 1:
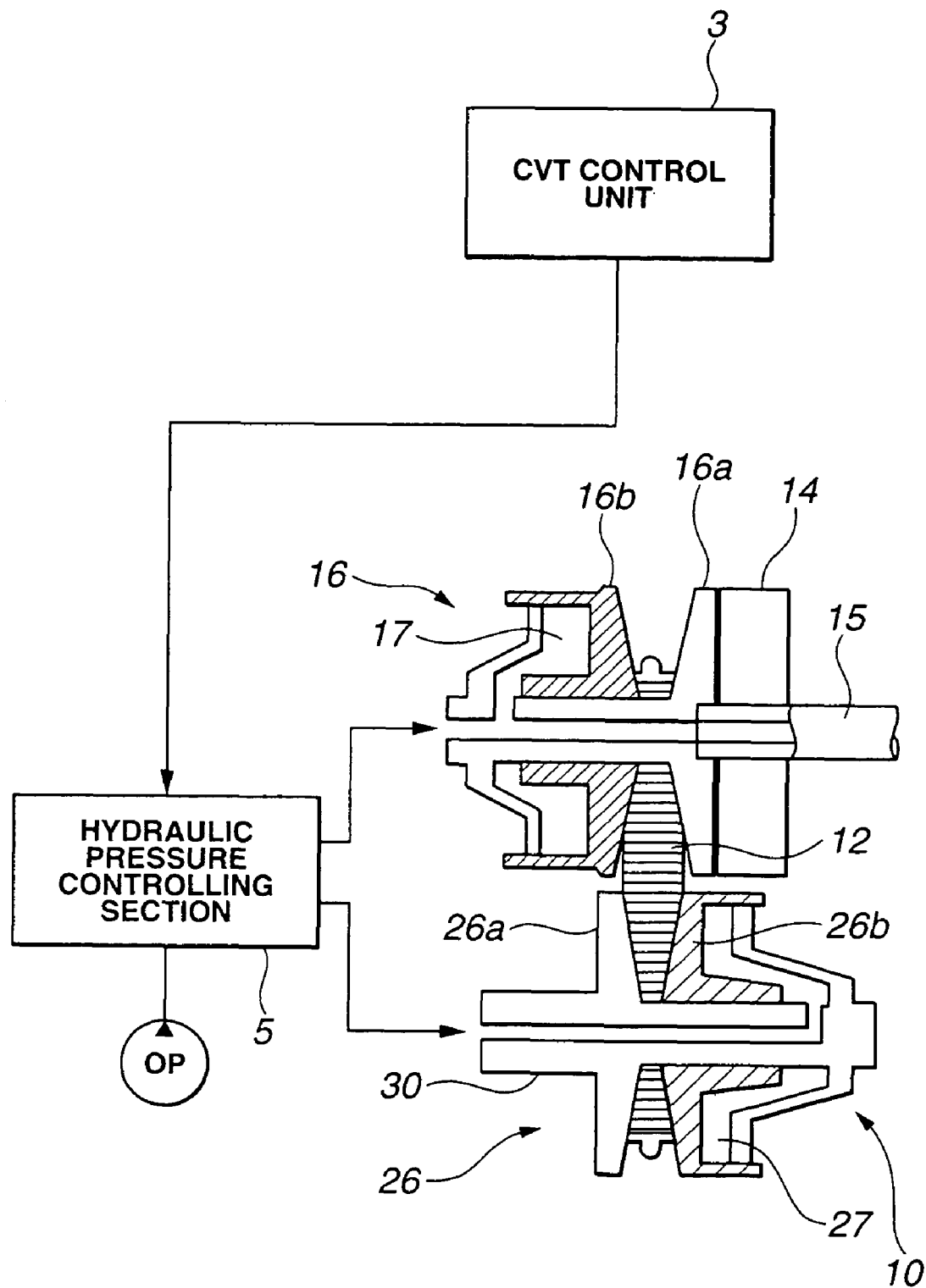
FIG. 1 is a diagram representing a control configuration of hydraulic pressures supplied to respective pulleys according to the present invention.

Reference will hereinafter be made to the drawings in order to facilitate a better understanding of the present invention. One example of belt-CVT (i.e., belt-type continuously variable transmission) will be explained with reference to FIG. 1. The belt-CVT includes a transmission mechanism section 10 which mainly has a primary pulley 16 disposed at a side of an input shaft 15 and a secondary pulley 26 disposed at a side of an output shaft 30 as a pair of pulleys. Input shaft 15 is coupled to an engine via a forward/backward (rotation) switching mechanism 14 and a torque converter equipped with a lockup clutch (not shown).

Primary pulley 16, forward/backward switching mechanism 14, and the torque converter are so disposed as to have same axis (i.e., coaxial to the others). Forward/backward switching mechanism 14 works according to working fluid supplied from a forward/backward switching control valve (not shown), thereby, switches between forward traveling and backward traveling of a vehicle.

Primary pulley 16 includes a fixed sheave 16a to which rotational force is transmitted by forward/backward switching mechanism 14, and a movable sheave 16b which can move in an axial direction. Movable sheave 16b is disposed so as to be opposed to fixed sheave 16a and thereby forms a V-shaped pulley groove. Secondary pulley 26 includes a fixed sheave 26a which rotates with output shaft 30 in an integrated fashion, and a movable sheave 26b which can move in an axial direction. Movable sheave 26b is disposed so as to be opposed to fixed sheave 26a and thereby forms a V-shaped pulley groove.

Primary pulley 16 and secondary pulley 26 respectively have a primary pulley cylinder chamber 17 and a secondary pulley cylinder chamber 27. Primary pressure is supplied to (i.e., acts on) primary pulley cylinder chamber 17 from a hydraulic pressure controlling section 5, and secondary pressure is supplied to secondary pulley cylinder chamber 27 from hydraulic pressure controlling section 5. Hydraulic pressure controlling section 5 generates line pressure by adjusting (or, controlling) hydraulic pressure derived from an oil pump OP. Then, hydraulic pressure controlling section 5 generates the primary pressure by adjusting the line pressure on the basis of command from a CVT control unit 3. Furthermore, hydraulic pressure controlling section 5 generates the secondary pressure by means of adjustment of the line pressure or without the adjustment of the line pressure (i.e., in this case, the secondary pressure is same pressure as the line pressure) on the basis of the command from CVT control unit 3.

While the vehicle is traveling, each width of the pulley grooves of primary pulley 16 and secondary pulley 26 is varied in accordance with the hydraulic pressure supplied to corresponding cylinder chamber 17 or cylinder chamber 27. Thereby, a contact radius between a V-belt 12 (looped over primary pulley 16 and secondary pulley 26) and primary pulley 16 and a contact radius between V-belt 12 and secondary pulley 26 are varied. Hence, rotational speed ratio between primary pulley 16 and secondary pulley 26 (i.e., speed ratio) can be continuously varied.

Figure 2:
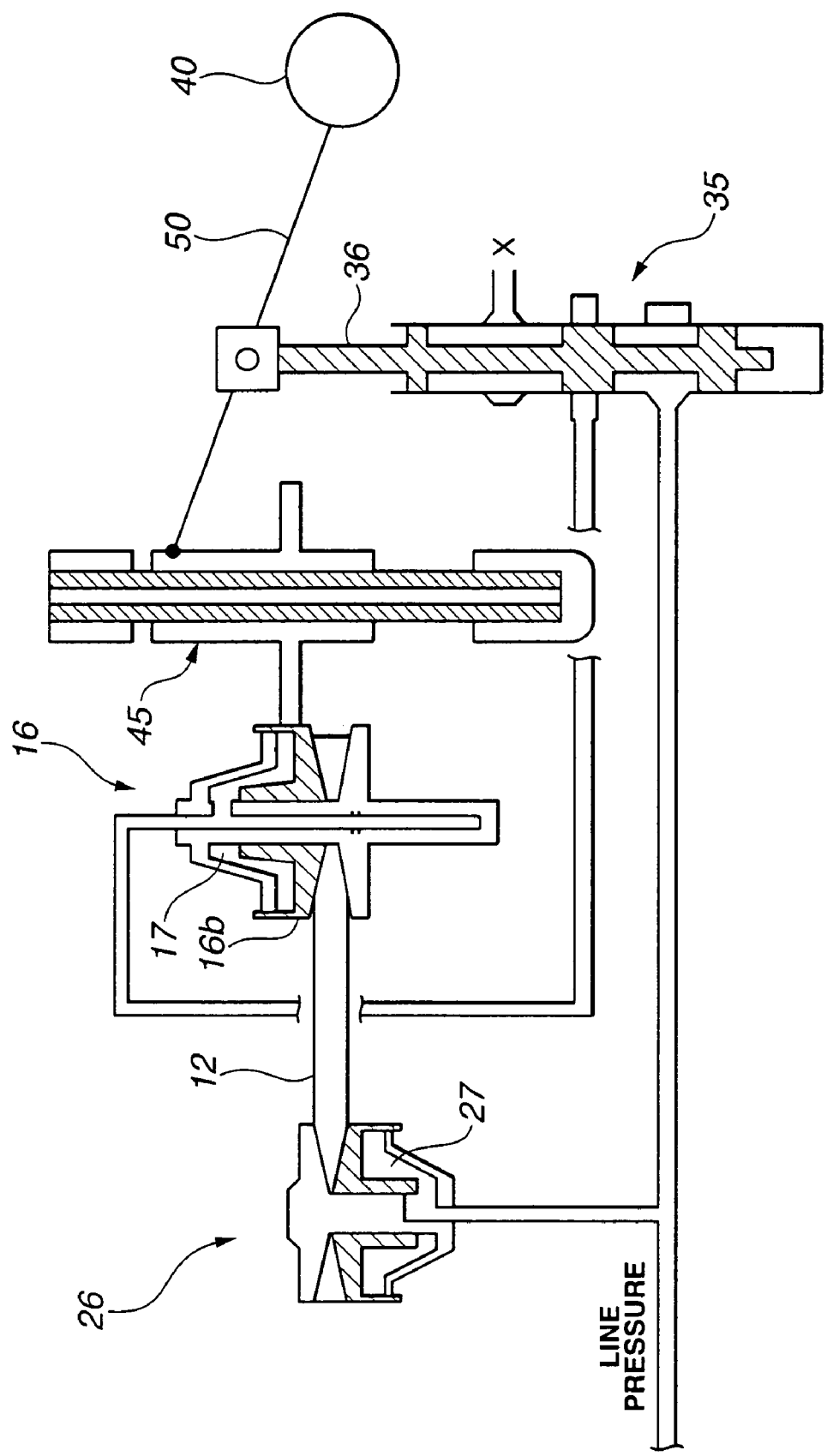
FIG. 2 is a diagram representing a configuration of a primary pressure supply system according to the present invention.

FIG. 2 shows a configuration of a primary pressure supply system to primary pulley cylinder chamber 17 in hydraulic pressure controlling section 5. Hydraulic pressure controlling section 5 includes a shift control valve 35 which controls the primary pressure by adjusting the line pressure. Moreover, the line pressure is supplied to secondary pulley cylinder chamber 27 as the secondary pressure.

A spool 36 of shift control valve 35 is coupled (or, connected) to the midpoint of a servo link 50 which constitutes a mechanical feedback mechanism. Hence, shift control valve 35 is driven by a stepping motor 40 which is coupled to one end of servo link 50. Another end of servo link 50 is coupled to a pulley follower 45 which follows movable sheave 16*b* of primary pulley 16. Thereby, shift control valve 35 receives feedback from (variation in) the groove width of primary pulley 16, namely, an actual speed ratio.

The speed ratio between primary pulley 16 and secondary pulley 26 is controlled by stepping motor 40 driven in accordance with shift command signal derived from CVT control unit 3. In addition, the line pressure is adjusted by an adjustment valve (not shown) on the basis of commands, for example, duty signal derived from CVT control unit 3. Namely, the line pressure is adjusted to be a predetermined value according to traveling state of the vehicle.

Figure 3:
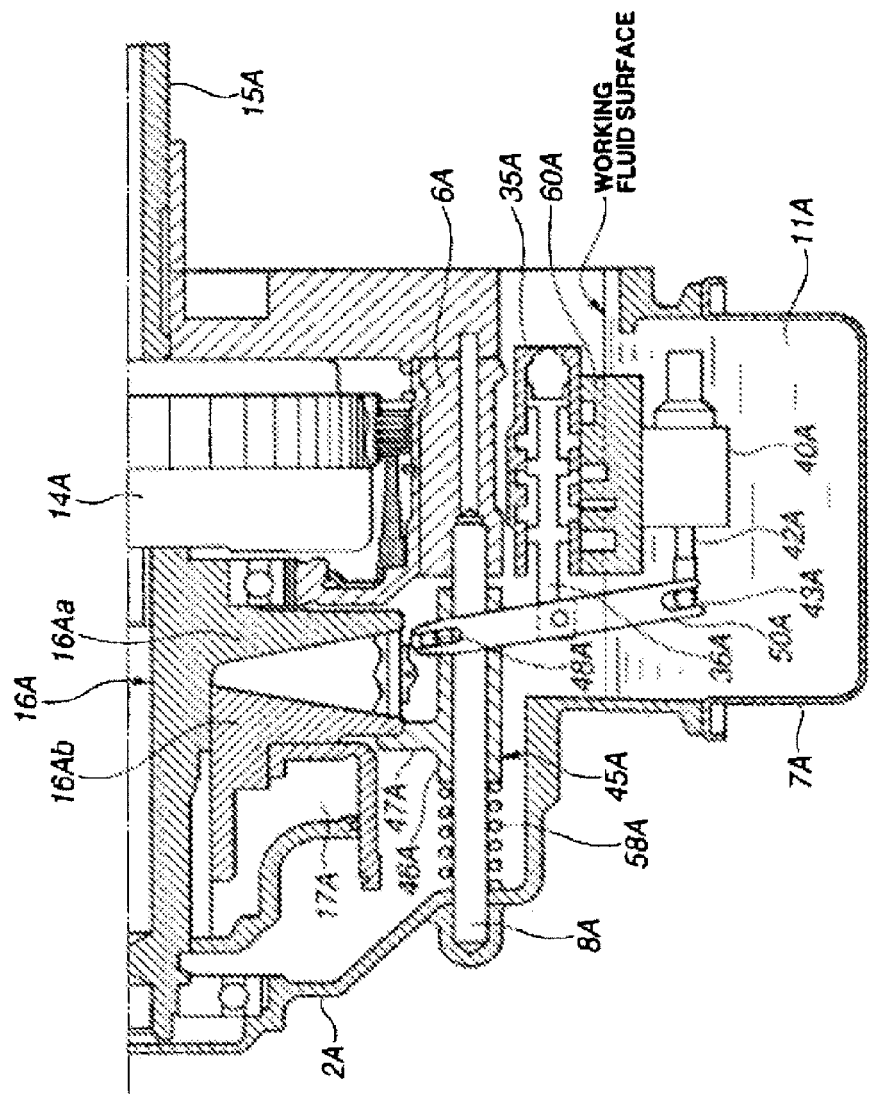
FIG. 3 is a diagram representing one example of layout in a belt-type continuously variable transmission, in which a stepping motor is disposed within a working fluid.

One comparative example of layout of the above-described stepping motor and servo link will now be explained with reference to FIG. 3 before explaining a layout according to the present invention. A guide axis 8A is disposed between a transmission case 2A and a pulley support block 6A fixed inside transmission case 2A. Also, guide axis 8A is so disposed directly underneath a primary pulley 16A inside transmission case 2A as to be parallel to a rotation axis of primary pulley 16A. A pulley follower 45A is supported by guide axis 8A so that pulley follower 45A can slide.

Pulley follower 45A is equipped with a contact portion 47A which extends from a tube portion 46A for passing guide axis 8A to a side of primary pulley 16A. One end of contact portion 47A is in contact with one surface of a movable sheave 16Ab of primary pulley 16A, which is opposite to another surface at a side of a fixed sheave 16Aa. A spring 58A is disposed between pulley follower 45A and transmission case 2A, around guide axis 8A. One end of contact portion 47A is always pressed against movable sheave 16Ab by spring 58A. Hence, pulley follower 45A slides along guide axis 8A according to an axial direction displacement of movable sheave 16Ab. Tube portion 46A of pulley follower 45A includes a support pin 48A which supports an end of a servo link 50A as will be described below.

Underneath guide axis 8A, a shift control valve 35A is disposed on an upper surface of a valve body 60A. A spool 36A of shift control valve 35A slides parallel to guide axis 8A. A stepping motor 40A is attached on an under surface of valve body 60A, and an output rod 42A of stepping motor 40A extends parallel to guide axis 8A. An end portion of output rod 42A is provided with a pin 43A. Servo link 50A extends in a vertical direction, and a midpoint portion of servo link 50A is so coupled to an end portion of spool 36A of shift control valve 35A as to be able to rotate. Moreover, an upper end of servo link 50A is connected to support pin 48A of pulley follower 45A, and an under end of servo link 50A is connected to pin 43A of output rod 42A.

Spool 36A of shift control valve 35A is driven in accordance with displacement of servo link 50A operated by stepping motor 40A. Then, spool 36A increases or decreases hydraulic pressure within a primary pulley cylinder chamber 17A (i.e., spool 36A supplies hydraulic pressure to or releases hydraulic pressure from a primary pulley cylinder chamber 17A). Thereby, spool 36A adjusts primary pressure so that target speed ratio commanded by (a driven position of) stepping motor 40A is achieved. When movable sheave 16Ab has moved and a shift motion is finished, shift control valve 35A is closed in response to reverse-direction displacement of servo link 50A.

At a lower portion of transmission case 2A, an oil pan 7A is attached. Oil pan 7A serves to store a working fluid 11A used for lubricating various parts or driving a forward/backward switching mechanism 14A and the pulleys. Heat generated in stepping motor 40A is cooled by working fluid 11A since stepping motor 40A is disposed within the stored working fluid 11A.

In the layout of the stepping motor and the servo link as described above, a space for disposing (or, installing) the stepping motor needs to be set within the stored working fluid. Hence, flexibility on layout of the space for disposing the stepping motor is restricted.

Figure 4:
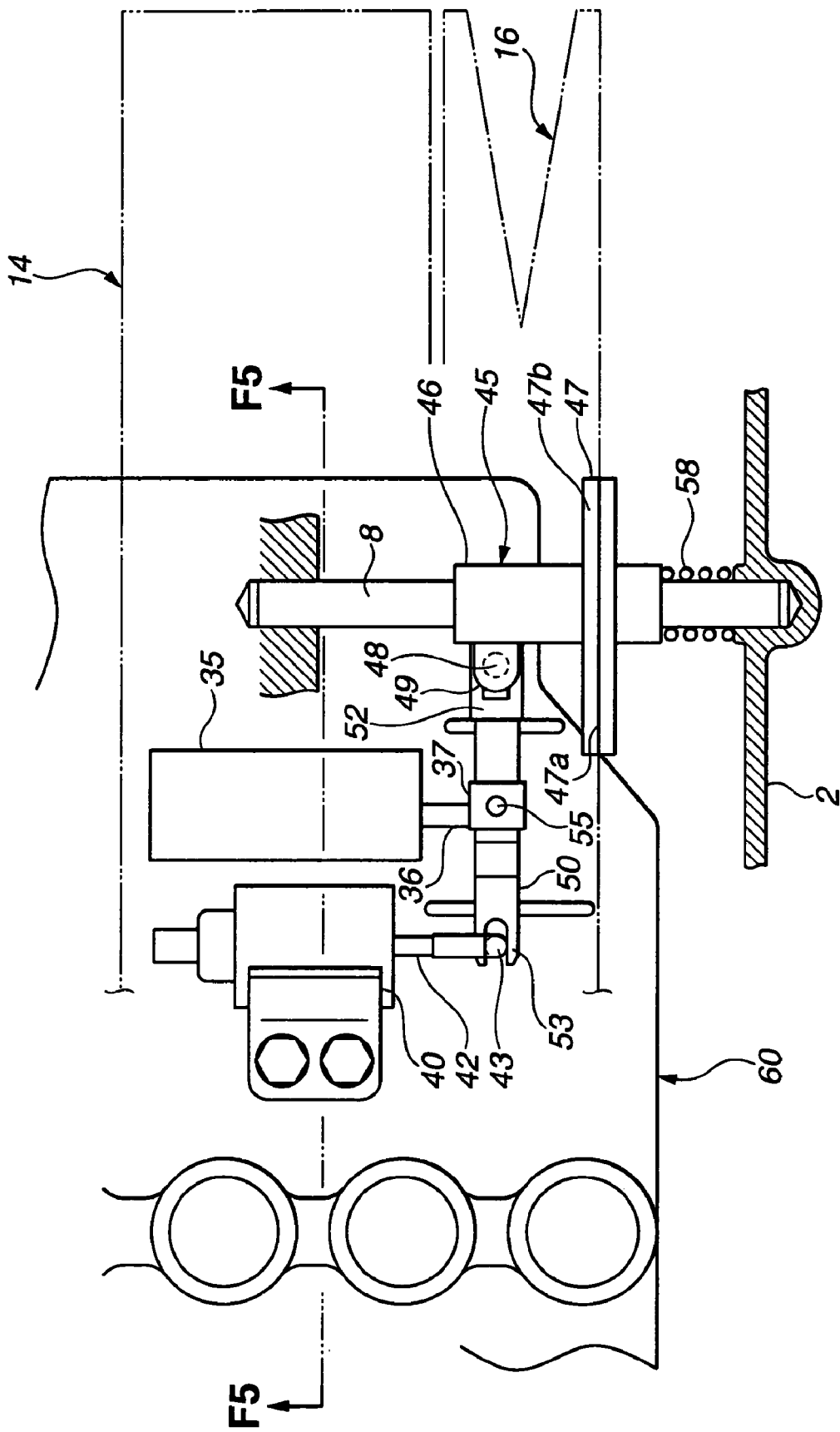
FIG. 4 is a plane view representing a first preferred embodiment of a stepping motor cooling apparatus for a belt-type continuously variable transmission according to the present invention.
Figure 5:
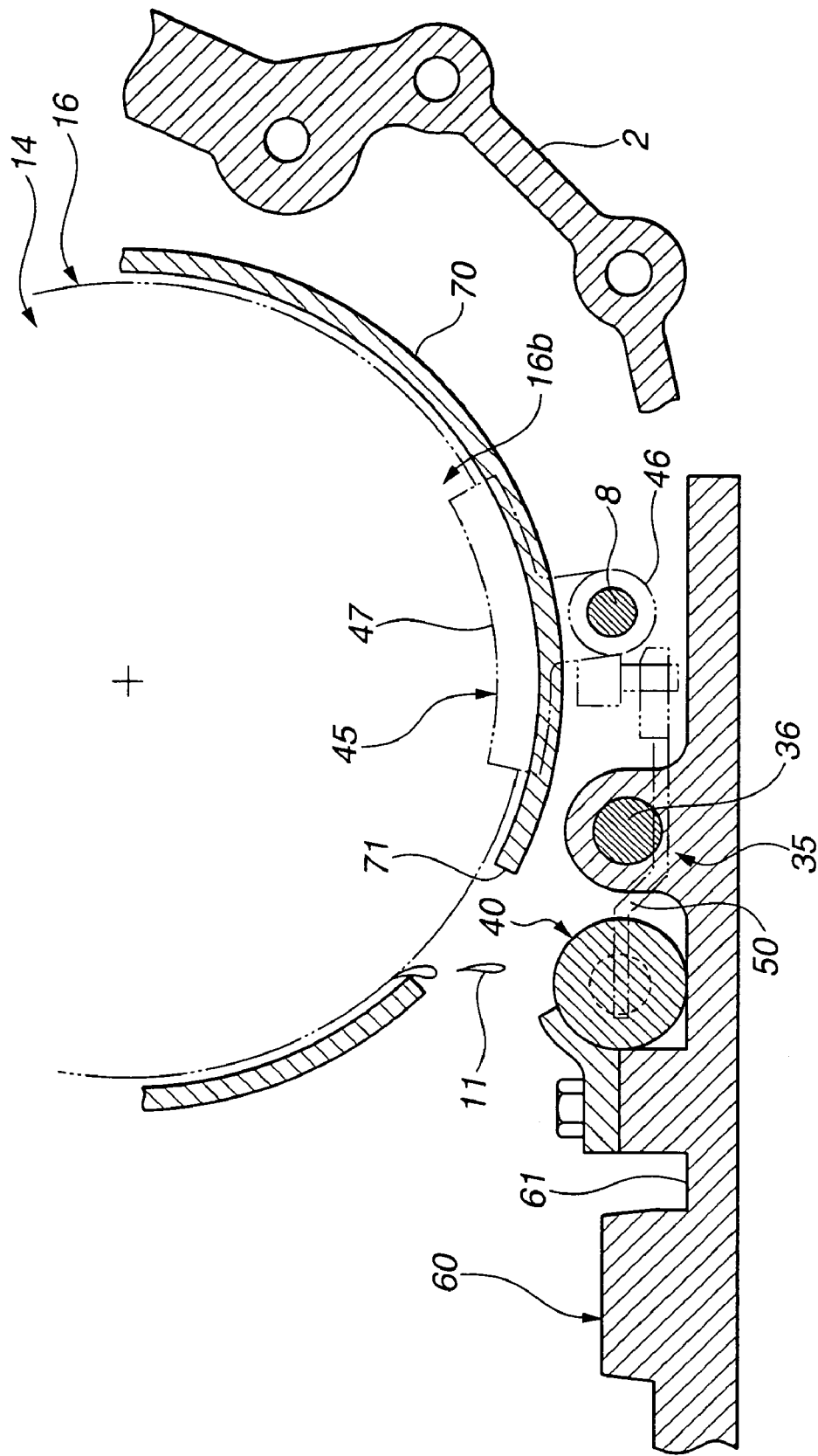
FIG. 5 is a sectional view of the stepping motor cooling apparatus shown in FIG. 4, taken along the line F5-F5.

Next, a first preferred embodiment according to the present invention will now be explained. FIG. 4 is a plane (upside) view representing the layout of the first embodiment according to the present invention. FIG. 5 is a sectional view of the layout shown in FIG. 4, taken along the line F5-F5. Directly underneath primary pulley 16 inside a transmission case 2, a guide axis 8 is disposed (approximately) parallel to a rotation axis of primary pulley 16. In a same fashion as the foregoing example, pulley follower 45 is supported by guide axis 8 so that pulley follower 45 can slide.

Pulley follower 45 is equipped with a contact portion 47 which extends from a tube portion 46 for passing guide axis 8 to a side of primary pulley 16. When viewing from a axial direction of guide axis 8, contact portion 47 forms an arc-shape that corresponds to an outer region (or, a far region from center) of movable sheave 16*b* of primary pulley 16. Moreover, contact portion 47 includes a first surface 47*a* which contacts one surface of movable sheave 16*b* that is opposite to another surface located at a side of fixed sheave 16*a* of primary pulley 16. And contact portion 47 includes a second surface 47*b* which fits an outer surface of movable sheave 16*b* (i.e., a rim surface of movable sheave 16*b*).

A spring 58 is disposed between pulley follower 45 and transmission case 2 around guide axis 8, and is disposed parallel to pulley follower 45. First surface 47*a* of contact portion 47 is always pressed against movable sheave 16*b* by spring 58. Hence, pulley follower 45 slides along guide axis 8 according to an axial direction displacement of movable sheave 16b, with pulley follower 45 fitting the outer region of movable sheave 16b. At an engine (not shown) side of primary pulley 16, forward/backward switching mechanism (or, unit) 14 is so disposed as to have a same axis as (i.e., as to be coaxial to) primary pulley 16. Forward/backward switching mechanism (or, unit) 14 works according to working fluid supplied from a forward/backward switching control valve (not shown). Foregoing explanations described until now in this embodiment are same as those of the above-described one comparative example.

A tube portion 46 of pulley follower 45 is equipped with a pin support portion 49. Pin support portion 49 extends laterally (horizontally) and makes a support pin 48 to extend toward a vertically downward direction. In addition, contact portion 47 is always in contact with the outer region of movable sheave 16b. Shift control valve 35 is formed in a valve body 60 which is disposed at an underside of primary pulley 16. Shift control valve 35 bulges upward from a base portion 61 of valve body 60. Namely, shift control valve 35 is constituted by a spool hole which is formed at the bulging portion and spool 36 which is so disposed as to be able to slide in the spool hole. The spool hole is located parallel to guide axis 8 at an approximately same height as guide axis 8.

On an upper surface of valve body 60, stepping motor 40 is attached (or, disposed) adjacent to shift control valve 35 at the opposite side of control valve 35 with reference to guide axis 8. Moreover, an output rod 42 of stepping motor 40 extends parallel to guide axis 8. Thereby, guide axis 8 and two axes of spool 36 of shift control valve 35 and output rod 42 of stepping motor 40 are so located as to be laterally adjacent to one another at the approximately same height.

An end portion of output rod 42 is divided into two parts. The divided parts are connected by a pin 43. An end portion of spool 36 of shift control valve 35 is equipped with a block 37 which has a pinhole. Servo link 50 extends horizontally. Then, a pin 55 is fixed at a midway (or, center) portion of servo link 50. The pinhole of block 37 provided to spool 36 is fitted to pin 55 so that servo link 50 can rotate.

Servo link 50 forms a flat plate shape. Both ends of servo link 50 are a connecting portion 52 and a connecting portion 53 which respectively form a bifurcated fork shape. One connecting portion 52 is fitted (or, connected) to support pin 48 of pulley follower 45 so that connecting portion 52 catches support pin 48 by the bifurcated fork. Then, another connecting portion 53 is fitted (or, connected) to pin 43 of output rod 42 of stepping motor 40 so that connecting portion 53 catches pin 43.

(A circumference of) Forward/backward switching mechanism 14 located above valve body 60 is surrounded by an inner case 70, which originates from transmission case 2 and almost forms cylindrical shape. Namely, inner case 70 is fixedly connected to transmission case 2. Directly above stepping motor 40, a dripping (through-) hole 71 is formed (or, disposed) through inner case 70.

Therefore, a working fluid 11 which is used for, e.g., lubricating a drive train or driving forward/backward switching mechanism 14 drips from (i.e., through) dripping hole 71 to stepping motor 40. Namely, dripping hole 71 allows working fluid 11 to drip on stepping motor 40. Working fluid 11 dropped on stepping motor 40 flows into an oil pan through a gap (or, clearance) between a lateral face of valve body 60 and an inside wall of transmission case 2. In addition, the oil pan is disposed below valve body 60.

In the layout of this embodiment, dripping hole 71 is disposed through inner case 70 vertically (i.e., directly) above stepping motor 40 as described above. Hence, working fluid 11 drained (or, eliminated) from forward/backward switching mechanism 14 and so on drips on stepping motor 40 from dripping hole 71. Therefore, stepping motor 40 can be cooled by working fluid 11. Namely, it is not necessary that stepping motor 40 is disposed within working fluid 11 stored inside the oil pan for cooling. Hence, stepping motor 40 can be cooled without restrictions on the layout of stepping motor 40.

Figure 6:
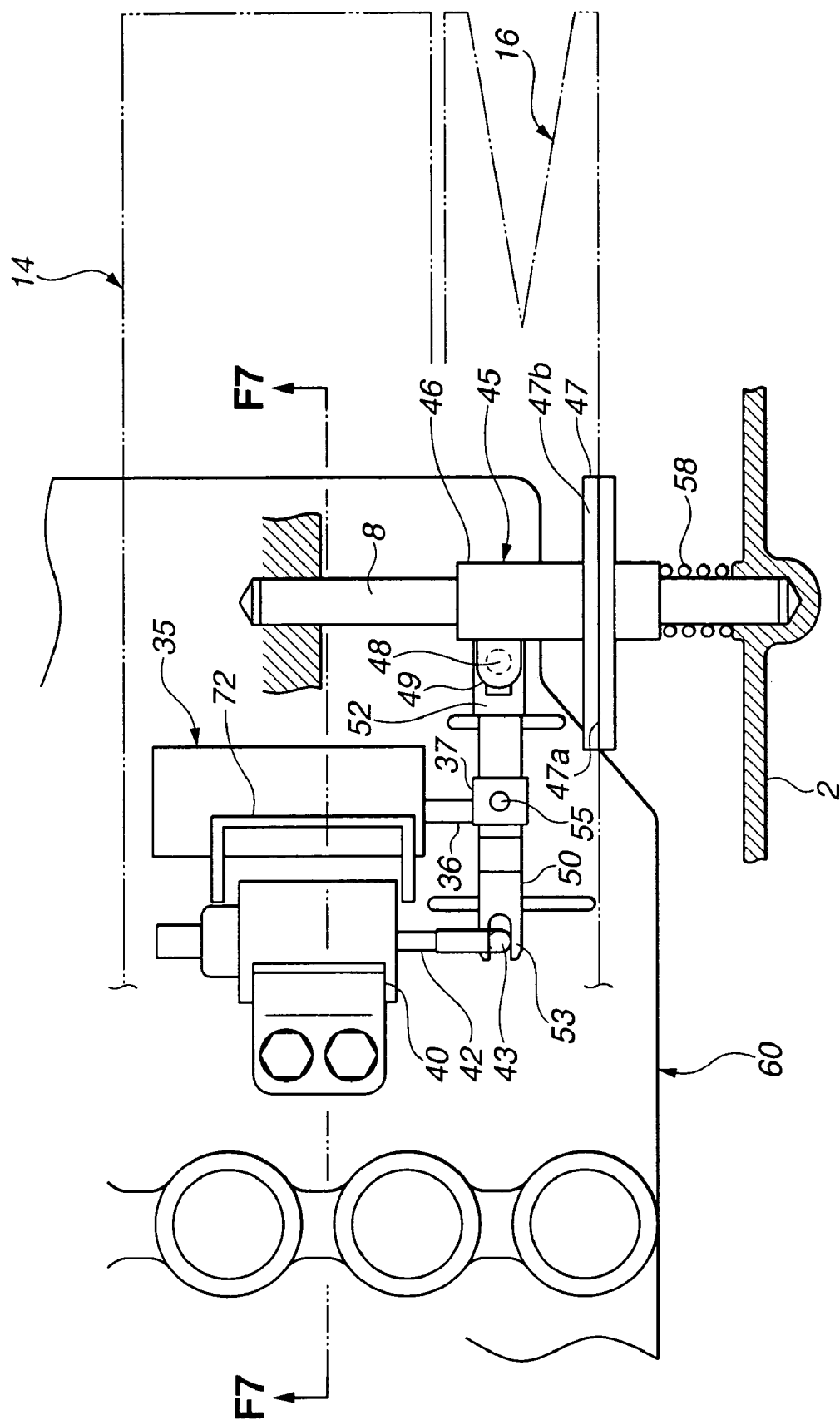
FIG. 6 is a plane view representing a second preferred embodiment of the stepping motor cooling apparatus for a belt-type continuously variable transmission according to the present invention.
Figure 7:
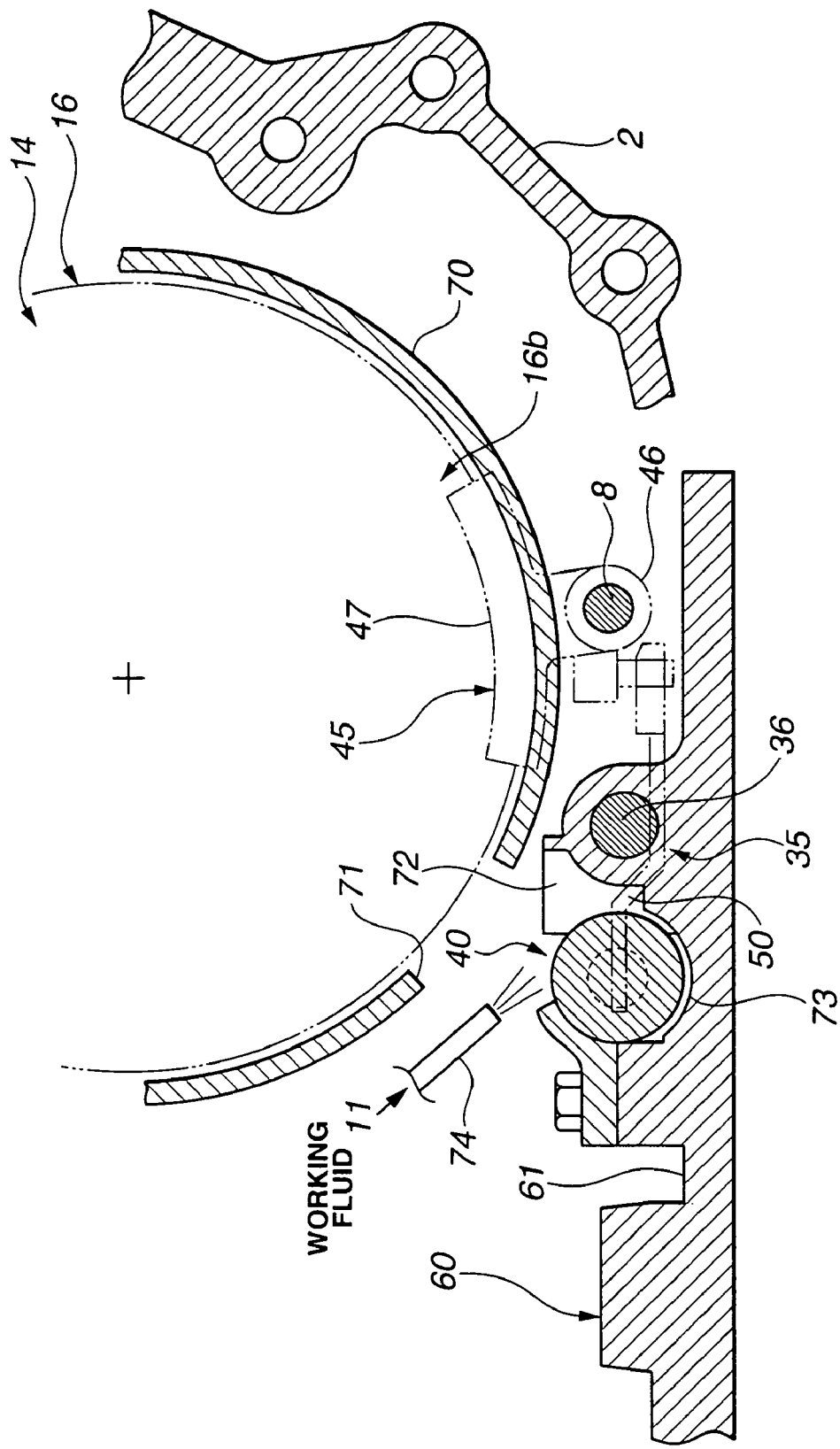
FIG. 7 is a sectional view of the stepping motor cooling apparatus shown in FIG. 6, taken along the line F7-F7.

FIG. 6 is a plane (upside) view representing a layout of a second embodiment according to the present invention. FIG. 7 is a sectional view of the stepping motor cooling apparatus shown in FIG. 6, taken along the line F7-F7. As shown in FIG. 6 and FIG. 7, a recess portion 73 which is bent along a periphery (or, circumference) shape of stepping motor 40 is formed at base portion 61 of valve body 60 immediately below stepping motor 40. Hence, recess portion 73 retains working fluid 11 which has dripped from dripping hole 71. Since a lower part of stepping motor 40 is soaked in working fluid 11, cooling effect of stepping motor 40 can be more improved.

Furthermore, as shown in FIG. 6 and FIG. 7, a rib (or, a fence) 72 generated from the bulging portion of shift control valve 35 that is formed so as to bulge upward from base portion 61 is formed at stepping motor 40's side from a top of the bulging portion. When looked down on from upside, Rib 72 is in a half-square shape (i.e., rib 72 is bent at an approximately right angle two times), and an opening (side) of rib 72 faces to stepping motor 40. An opening width of rib 72 is so designed as to be a little wider than stepping motor 40. So the opening of rib 72 encloses a part of stepping motor 40. Hence, working fluid 11 which has dripped toward shift control valve 35 by deviating from stepping motor 40 is also guided to stepping motor 40 assuredly. Therefore, the cooling effect of stepping motor 40 can be more improved.

Furthermore, a nozzle 74 which is connected to an oil passage conducting working fluid 11 (drained from, e.g., forward/backward switching mechanism 14) to the oil pan, may be disposed above stepping motor 40. Working fluid 11 can be dropped (or, injected) from nozzle 74 to stepping motor 40. Therefore, working fluid 11 can be more assuredly dropped toward stepping motor 40, thereby, the cooling effect of stepping motor 40 can be more improved.

This application is based on a prior Japanese Patent Application No. 2004-108197 filed on Mar. 31, 2004. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A stepping motor cooling apparatus for a continuously variable transmission, comprising:
   a pair of primary and secondary pulleys disposed inside a transmission case;
   a forward/backward switching unit disposed coaxially to the primary pulley;
   a stepping motor disposed below the forward/backward switching unit and inside the transmission case;
   an inner case originating from the transmission case, a circumference of the forward/backward switching unit being surrounded by the inner case, a dripping hole being formed through the inner case at an inner case's portion directly above the stepping motor to allow working fluid drained from the forward/backward switching unit to drip on the stepping motor;

a recess portion located directly below a portion of the stepping motor, wherein the recess portion is configured to retain the working fluid;
a valve body disposed below the primary pulley;
a shift control valve installed on an upper surface of the valve body, the shift control valve being disposed in a horizontal direction from a pulley follower fitted to a movable sheave of the primary pulley;
a servo link extending in the horizontal direction, one end of the servo link being connected to the pulley follower and another end thereof being connected to the stepping motor, an approximately center portion of the servo link being coupled to the shift control valve; and
a guide shaft disposed substantially parallel to a rotation axis of the primary pulley, the pulley follower being slidably supported by the guide shaft,
wherein the stepping motor is attached on the upper surface of the valve body and is positioned adjacent to the shift control valve in the horizontal direction from the pulley follower,
wherein the shift control valve, the stepping motor and the guide shaft are located to overlap with one another in the horizontal direction which is perpendicular to a dripping direction of the working fluid.

2. A stepping motor cooling apparatus for a continuously variable transmission as claimed in claim 1,
wherein the valve body is disposed under the stepping motor and inside the transmission case,
wherein the recess portion is located at the upper surface of the valve body, and
wherein a second portion of the stepping motor is configured to sit within the recess portion.

3. A stepping motor cooling apparatus for a continuously variable transmission as claimed in claim 2, wherein the recess portion is formed in a shape along a periphery of the stepping motor to soak the stepping motor in the working fluid retained within the recess portion.

4. A stepping motor cooling apparatus for a continuously variable transmission as claimed in claim 1,
wherein the valve body is disposed inside the transmission case and under the stepping motor, and
wherein a rib originating from the upper surface of the valve body and to guide the working fluid to the stepping motor is formed at, at least, a part around the stepping motor.

5. A stepping motor cooling apparatus for a continuously variable transmission as claimed in claim 4, wherein the rib is in a half-square shape and an opening of the rib encloses a part of the stepping motor.

6. A stepping motor cooling apparatus for a continuously variable transmission as claimed in claim 1, wherein a nozzle to guide the working fluid drained from the forward/backward switching unit to an area above the stepping motor and to drop the guided working fluid to the stepping motor, is disposed above the stepping motor.

7. A stepping motor cooling apparatus for a continuously variable transmission as claimed in claim 6, wherein the nozzle is connected to an oil passage of the working fluid drained from the forward/backward switching unit and guides the working fluid to the area above the stepping motor.

8. A stepping motor cooling apparatus for a continuously variable transmission as claimed in claim 1,
wherein a belt is looped over the primary and secondary pulleys inside the transmission case, and a primary pressure controlled by the shift control valve acts on the primary pulley, and
wherein the servo link through which the stepping motor is coupled to the shift control valve follows a variation in groove width of the primary pulley.

9. A stepping motor cooling method for a continuously variable transmission, comprising:
disposing a pair of primary and secondary pulleys inside a transmission case;
disposing a forward/backward switching unit coaxially to the primary pulley;
disposing a stepping motor below the forward/backward switching unit and inside the transmission case;
disposing a recess portion below a portion of the stepping motor;
surrounding a circumference of the forward/backward switching unit with an inner case originating from the transmission case;
disposing a valve body below the primary pulley;
installing a shift control valve on an upper surface of the valve body, the shift control valve being disposed in a horizontal direction from a pulley follower fitted to a movable sheave of the primary pulley;
attaching the stepping motor on the upper surface of the valve body, and positioning the stepping motor adjacent to the shift control valve in the horizontal direction from the pulley follower;
extending a servo link in the horizontal direction, one end of the servo link being connected to the pulley follower and another end thereof being connected to the stepping motor, an approximately center portion of the servo link being coupled to the shift control valve;
disposing a guide shaft substantially parallel to a rotation axis of the primary pulley, the pulley follower being slidably supported by the guide shaft;
dropping working fluid drained from the forward/backward switching unit on the stepping motor from a dripping hole formed through the inner case at an inner case's portion directly above the stepping motor;
retaining the working fluid in the recess portion; and
locating the shift control valve, the stepping motor and the guide shaft to overlap with one another in the horizontal direction which is perpendicular to a dripping direction of the working fluid.

10. A stepping motor cooling apparatus for a continuously variable transmission, comprising:
a pair of primary and secondary pulleys disposed inside a transmission case;
forward/backward switching means for switching forward/backward rotation of the pulleys, the forward/backward switching means being disposed coaxially to the primary pulley and inside the transmission case;
a stepping motor disposed below the forward/backward switching means;
inner casing means for surrounding a circumference of the forward/backward switching means and for allowing working fluid drained from the forward/backward switching means to drip on the stepping motor, the inner casing means originating from the transmission case, a dripping hole being formed through the inner casing means at an inner casing means' portion directly above the stepping motor to allow working fluid to drip on the stepping motor;
a recess portion located directly below a portion of the stepping motor, and wherein the recess portion is configured to retain the working fluid;
a valve body disposed below the primary pulley;
a shift control valve installed on an upper surface of the valve body, the shift control valve being disposed in a horizontal direction from a pulley follower fitted to a movable sheave of the primary pulley;

the stepping motor attached on the upper surface of the valve body, and positioned adjacent to the shift control valve in the horizontal direction from the pulley follower;

a servo link extending in the horizontal direction, one end of the servo link being connected to the pulley follower and another end thereof being connected to the stepping motor, an approximately center portion of the servo link being coupled to the shift control valve; and a guide shaft disposed substantially parallel to a rotation axis of the primary pulley, the pulley follower being slidably supported by the guide shaft, wherein the shift control valve, the stepping motor and the guide shaft are located to overlap with one another in the horizontal direction which is perpendicular to a dripping direction of the working fluid.

* * * * *